(12) United States Patent
Lisec

(10) Patent No.: US 7,690,870 B2
(45) Date of Patent: Apr. 6, 2010

(54) DEVICE FOR TRANSPORTING AND SUPPORTING SHEET-SHAPED ARTICLES, ESPECIALLY SHEETS OF GLASS

(76) Inventor: Peter Lisec, Bahnhofstr. 34, A-3363, Amstetten-Hausmening (AT)

( * ) Notice: Subject to any disclaimer, the term of this patent is extended or adjusted under 35 U.S.C. 154(b) by 489 days.

(21) Appl. No.: 11/313,844

(22) Filed: Dec. 22, 2005

(65) Prior Publication Data
US 2006/0180140 A1    Aug. 17, 2006

(30) Foreign Application Priority Data
Dec. 23, 2004  (AT) .............................. A 2163/2004

(51) Int. Cl.
 *B65G 53/52* (2006.01)
(52) U.S. Cl. ............................... 406/92; 406/86; 406/88
(58) Field of Classification Search .................. 406/86, 406/87, 88, 70, 92; 65/182.2
See application file for complete search history.

(56) References Cited

U.S. PATENT DOCUMENTS

| | | | |
|---|---|---|---|
| 3,223,443 A | | 12/1965 | Misson |
| 3,395,943 A | * | 8/1968 | Dennis et al. .................. 406/88 |
| 3,449,102 A | * | 6/1969 | Chaumont et al. ............ 65/25.2 |
| 3,455,669 A | * | 7/1969 | McMaster et al. ........... 65/182.2 |
| 3,455,670 A | * | 7/1969 | McMaster ................... 65/182.2 |
| 3,455,671 A | * | 7/1969 | McMaster ................... 65/182.2 |
| 3,473,910 A | * | 10/1969 | Wilde et al. ................. 65/182.2 |
| 4,081,201 A | * | 3/1978 | Hassan et al. .................. 406/88 |
| 4,702,664 A | * | 10/1987 | Lukens, Jr. ................... 414/676 |
| 5,078,775 A | * | 1/1992 | Maltby et al. ............... 65/182.2 |
| 5,431,527 A | * | 7/1995 | Yamazaki et al. ............ 414/676 |
| 5,439,341 A | * | 8/1995 | Yamazaki et al. ............ 414/676 |
| 5,501,569 A | * | 3/1996 | Yamazaki et al. ............ 414/676 |
| 5,562,395 A | * | 10/1996 | Yamazaki et al. ............ 414/676 |
| 5,562,396 A | * | 10/1996 | Yamazaki et al. ............ 414/676 |
| 5,634,636 A | * | 6/1997 | Jackson et al. ............... 271/225 |
| 6,626,612 B2 | * | 9/2003 | Knapp .......................... 406/19 |
| 6,781,684 B1 | * | 8/2004 | Ekhoff ...................... 356/237.1 |
| 6,969,224 B2 | * | 11/2005 | Miyachi et al. .............. 414/676 |
| 7,037,063 B2 | * | 5/2006 | Park et al. .................... 414/676 |
| 7,107,792 B2 | * | 9/2006 | Langsdorf et al. ............. 65/25.2 |
| 7,108,123 B2 | * | 9/2006 | Zeidler et al. ................ 198/493 |
| 7,128,516 B2 | * | 10/2006 | Sugiyama et al. ............ 414/676 |
| 2004/0197184 A1 | | 10/2004 | Sugiyama et al. |
| 2006/0165496 A1 | * | 7/2006 | Miyachi et al. ................ 406/88 |

FOREIGN PATENT DOCUMENTS

| | | |
|---|---|---|
| EP | 1 449 619 | 8/2004 |
| WO | WO 03/060961 | 7/2003 |
| WO | WO 2004/050516 | 6/2004 |

OTHER PUBLICATIONS

International Search Report, dated Mar. 22, 2006.

\* cited by examiner

*Primary Examiner*—Gene Crawford
*Assistant Examiner*—William R Harp
(74) *Attorney, Agent, or Firm*—Young & Thompson

(57) ABSTRACT

To ensure that the support force which is dependent on the pressure of a support fluid is essentially the same also in the edge area of an article (9), especially sheets of (flat) glass, which is to be held or transported, as the support force in the middle area of the surface of the article (9), the device (1) as claimed in the invention on at least one support wall (3 or 5) provides for feed openings (21) to which drain openings (23) are directly assigned.

20 Claims, 4 Drawing Sheets

DEVICE FOR TRANSPORTING AND SUPPORTING SHEET-SHAPED ARTICLES, ESPECIALLY SHEETS OF GLASS

BACKGROUND OF THE INVENTION

The invention relates to a device for transporting and supporting flat, sheet-shaped articles, especially sheets of (flat) glass.

For supporting sheets of glass, keeping them supported on an air cushion film or between liquid films (water films) and moving them in the direction of their plane are known.

Devices in which sheets of glass are supported on one or both sides in working and for transport between liquid films are known from EP 1 449 619 A and WO 2004/050516.

The disadvantage in these known processes is that the fluid which supports the sheets of glass (gas, especially air, or liquid, especially water) must flow out laterally between the support wall and the supported sheet of glass so that the support force in the edge area is not sufficient due to the lower pressure in the fluid which prevails there. This is especially disadvantageous when the sheet of glass is to be worked, for example roughened (EP 1 449 619 A), cut by a water jet (WO 2004/050516 A) or scratched for division of the glass sheet into glass shapes.

SUMMARY OF THE INVENTION

The object of the invention is to avoid the disadvantages of the known devices and to ensure that the article, especially the sheet of glass, is guided and supported uniformly over its entire surface, therefore also in the edge area, with sufficient support force.

This object is achieved as claimed in the invention with a device which has the features of claim 1.

Preferred and advantageous embodiments of the invention are the subject matter of the dependent claims.

In the device as claimed in the invention, the support fluid from one or especially several feed openings in the support wall enters the space between the support wall and the article to be held, especially the sheet of glass to be held. The support fluid need no longer flow out over the edge of the sheet of glass, but is drawn off again through the drain openings provided in the vicinity of the feed opening. In the device as claimed in the invention at lower losses of support fluid this also yields uniform support of the articles since the feed openings for the support fluid and the drain openings for the support fluid can be arranged uniformly distributed over the entire surface of the support wall. Thus, as claimed in the invention in one preferred embodiment it is ensured that the pressure of the support fluid is essentially the same over the entire surface of the article, especially a sheet of glass, and the desired exact guidance and support of the article are reliably achieved.

Within the framework of the invention it is preferable if drain openings for the support fluid are located around the feed openings for the support fluid, therefore the openings through which the support fluid enters the space between the support wall and the article through the support wall.

In order to achieve a pressure build-up in the support fluid in the space between the support wall and the plate-shaped or sheet-shaped article, especially a sheet of glass, it can be provided that the inside cross section of the feed opening is somewhat greater than the sum of the inside cross sections of all the drain openings for the support fluid which are assigned to this feed opening and which are arranged for example around it.

One advantage in the invention is furthermore that the pressure of the support fluid with which it is conveyed to the feed openings can be matched to the weight of the article (size and thickness of the sheet of glass).

In one exemplary embodiment, groups consist of at least one feed opening and the drain openings assigned to it are arranged uniformly distributed over the entire surface of the support wall located on one side of the article or over the entire surfaces of the support walls which are located on both sides of the sheet of glass.

In the invention the support fluid can be provided simply on one side or on both sides of the article which is to be transported and supported.

For example, each feed opening has a diameter of roughly 5 mm, conversely the drain openings which are arranged for example at a distance from 2 to 3 mm from the feed opening can have a diameter of roughly 0.5 mm.

Other details, advantages and features of the invention follow from the description of preferred embodiments below using the attached drawings.

DETAILED DESCRIPTION OF THE PREFERRED EMBODIMENTS

Figure 1:
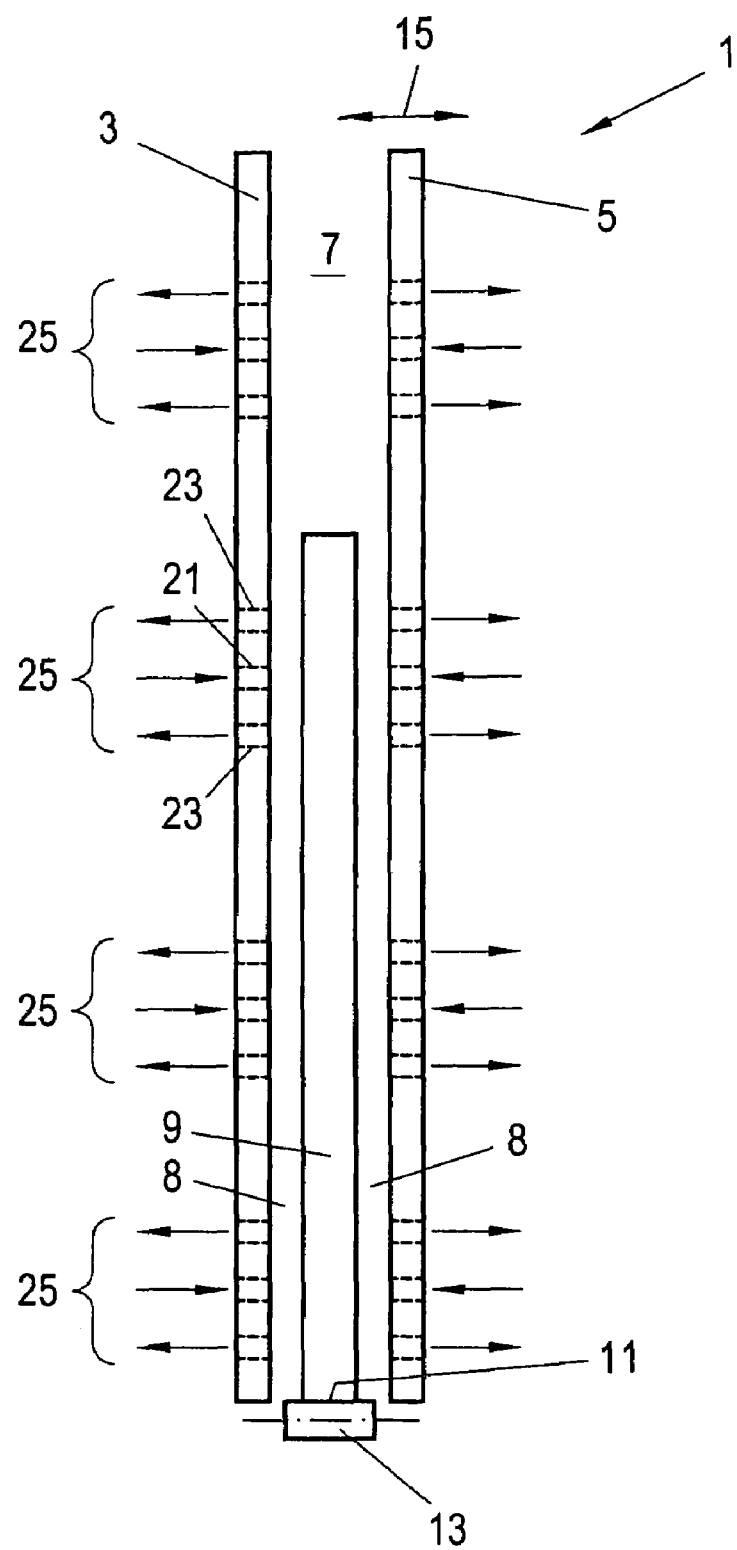
FIG. 1 schematically shows a device as claimed in the invention with two support walls.

The device 1 as claimed in the invention in the illustrated exemplary embodiment consists of two plates which are used as support walls 3, 5 and which are aligned for example parallel to one another, for holding a sheet of glass 9 in their intermediate space 7 and for transporting it, if desired. The sheet of glass 9 with its lower horizontal edge 11 rests on a support and conveyor means 13 which is formed from a number of transport rollers, a continuous conveyor belt or from several such continuous conveyor belts.

The distance of the plates 3, 5 from one another can be matched to the thickness of the sheet of glass 9 which is to be held between them, for example by at least one of the plates 3, 5 being adjustable transversely to its superficial extension (double arrow 15 in FIG. 1).

Although in FIG. 1 one embodiment with two support walls 3, 5 is shown, the invention can be equally applied to devices in which there is only one support wall. In this case, the one support wall 3 or 5 as usual is tilted preferably a few degrees (3 to 5°) to the vertical, a sheet of glass 9 being located next to the obliquely upwardly pointing surface of the support wall 3 or 5.

In each of the two support walls 3, 5 there are feed openings 21 for a support fluid and drain openings 23 through which the support fluid can drain again out of the space 7 or the component spaces 8 between the sheet of glass 9 and the support walls 3, 5.

Here an embodiment is preferred in which groups 25 of feed openings 21 and especially drain openings 23 located around them for the support fluid are arranged especially uniformly distributed over the entire surface of the support walls 3, 5. This is shown in FIG. 1 by arrows and the schematically indicated feed and drain openings 21, 23.

Figure 2:
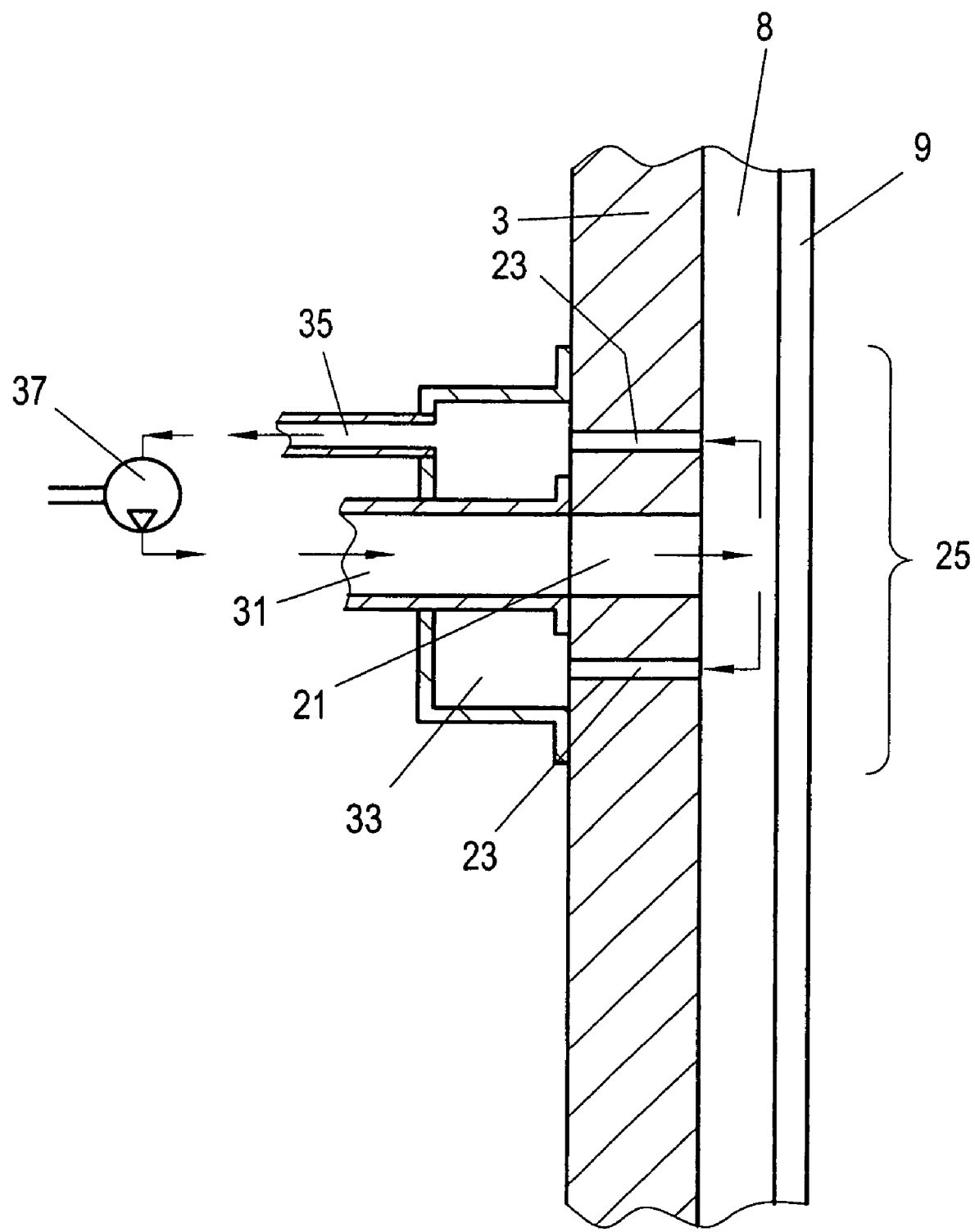
FIG. 2 shows a detail of the device from FIG. 1 on an enlarged scale.

In the embodiment shown in FIG. 2 on an enlarged scale, each feed opening 21 for supplying support fluid is assigned a line 31 through which the support fluid is supplied so that it can enter the space 8 between the support wall 3 and the sheet of glass 9 through the feed opening 21. To draw off the support fluid by way of the drain openings 23 out of the space 8 between the sheet of glass 9 and the support wall 3, there is a chamber 33 from which a drain line 35 proceeds. Here it can be provided that the drain line 35 via which the support fluid is withdrawn is optionally connected via a pressure increasing device 37 (pump or the like) to the supply line 31 which supplies support fluid to the feed opening 21.

Figure 3:
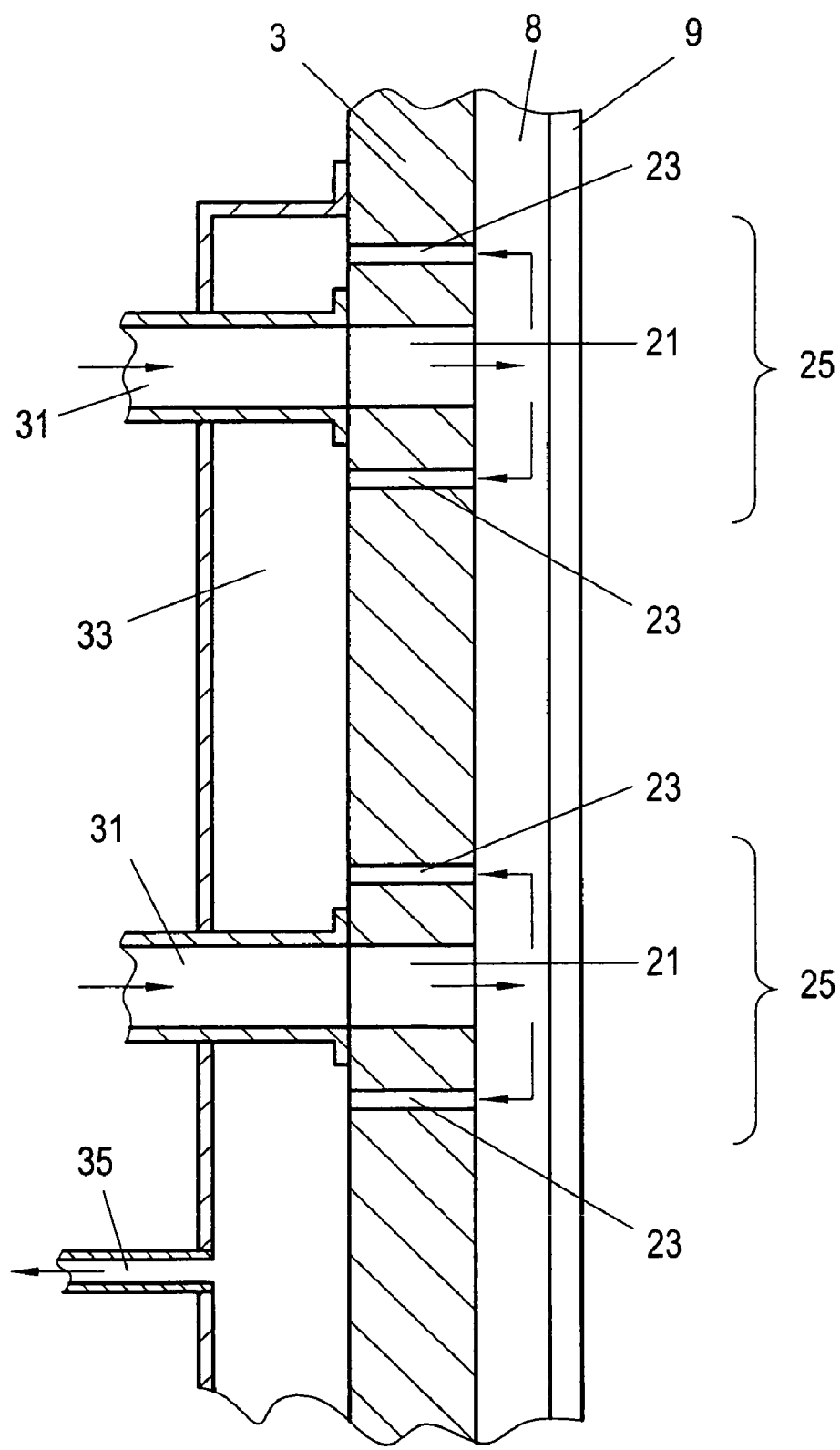
FIG. 3 shows a detail of a modified embodiment of the device from FIG. 1 on an enlarged scale.

In the embodiment shown in FIG. 3, the chamber 33 into which support fluid drains out of the space 8 between the support wall 3 and the sheet of glass 9 through the exit openings 23 is made common to all exit openings 23 and is made with only one drain line 35 for draining support fluid. Here the drain line 35 via which support fluid is withdrawn from the chamber 33 can be connected to the supply line 31 via which support fluid is supplied, and here one, two or more pressure raising devices (pump 37) can also be connected.

Figure 4:
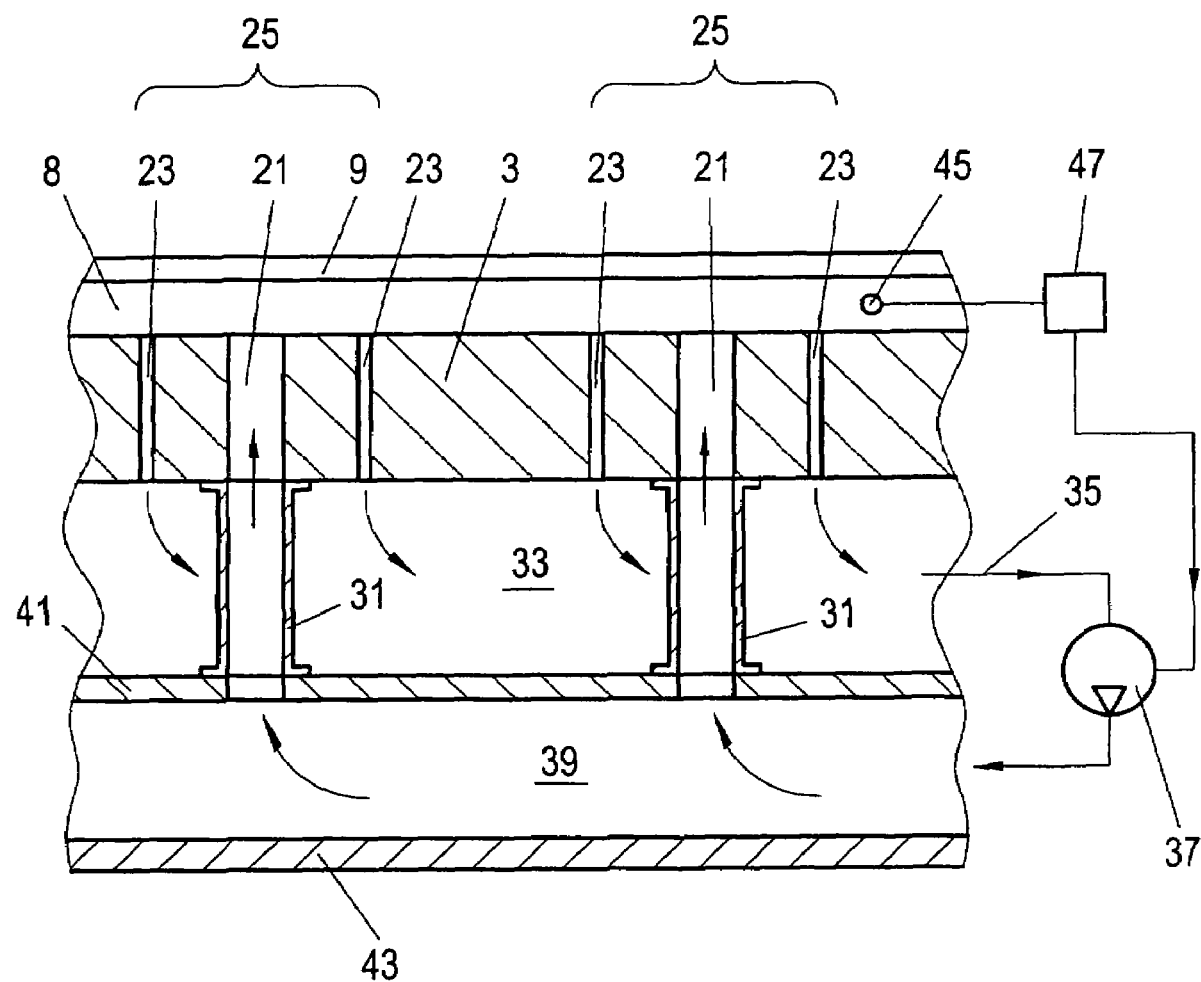
FIG. 4 shows another embodiment.

The embodiment of a device as claimed in the invention which is illustrated in FIG. 4 shows that the invention can also be used for articles 9 which are aligned horizontally reclining, especially (flat) glass sheets. In this case the sheet of glass 9 is horizontally aligned in the same manner as the support wall 3 and the space 8 between the sheet of glass 9 and the support wall 3. In the support wall 3 again there are groups 25 of feed openings 21 and especially drain openings 23 located around them for the support fluid arranged preferably uniformly distributed over its surface. What was stated above about the embodiments of FIGS. 2 and 3 applies to the feed openings 21 and the drain openings 23, their arrangement and size.

In the embodiment shown in FIG. 4, all the drain openings 23 discharge into a chamber 33 which is located between the support wall 3 and a wall 41 which is preferably parallel to it. Draining support fluid is removed from the chamber 33 through a line 35 and routed to a pump 37. The support fluid is conveyed by a pump 37 into a chamber 39 between the wall 41 and another wall 43 which can likewise be aligned parallel to the walls 3 and 41. The support fluid flows out of the chamber 39 by way of the supply lines 31 to the feed openings 21 and out of them into the space 8 between the sheet of glass 9 and the support wall 3. Any losses of support fluid are made up.

In all embodiments of the device as claimed in the invention, in the space 8 there can be a pressure sensor 45 which by way of a control 47 controls the pump 37 such that the pressure which is desired at the time and which is necessary for safe transport of the sheet of glass 9 is maintained in the space 8.

The embodiment shown in FIG. 4 with two spaces 33 and 39 which are shown next to the support wall 3 can likewise be implemented in embodiments with one or two essentially vertical support walls 3 and 5.

Both gases and liquids, preferably air or water, are possible as the support fluid in the device 1 as claimed in the invention.

In summary, one embodiment of the invention can be described as follows:

To ensure that the support force which is dependent on the pressure of a support fluid is essentially the same also in the edge area of an article 9, especially sheets of (flat) glass, which is to be held or transported, as the support force in the middle area of the surface of the article 9, the device 1 as claimed in the invention on at least one support wall 3 or 5 provides for feed openings 21 to which drain openings 23 are directly assigned.

The invention claimed is:

1. A device (1) for transporting and supporting a flat, sheet-shaped article (9), said device comprising:
   at least one support wall (3) having a first side and an opposite second side, the first side of said support wall facing and supporting the article via a support fluid;
   plural feed openings (21) in said support wall, said feed openings configured to receive the support fluid so that the support fluid is directed to and supports the article (9);
   plural drain openings (23) in said support wall, said drain openings configured to drain the support fluid, each drain opening being assigned to a corresponding one of the feed openings (21); and
   a draining chamber (33) common to all drain openings (23) of said support wall and on the second side of said support wall,
   wherein a support force exerted by the support fluid in an edge area of the article (9) is equal to a support force exerted by the support fluid over a surface in a middle area of the article (9),
   wherein a drain line (35) proceeds from the draining chamber (33),
   wherein the drain line (35) is connected to a supply line (31) by way of a pressure increasing device (37),
   wherein the draining chamber (33), through which support fluid is drawn off, and a supply chamber (39) through which support fluid is supplied, are on the second side of the support wall (3) facing away from the space (8) between the article (9) and the support wall (3),
   wherein the draining chamber (33) extends over the entire surface of the second side of the support wall (3),
   wherein the pressure increasing device (37) is connected on an intake side to the draining chamber (33) and on a pressure side to the supply chamber (39), and
   wherein an inside cross section of each feed opening (21) is larger than the sum of the inside cross sections of the drain openings (23) assigned to the feed opening (21).

2. The device as claimed in claim 1, wherein there are two support walls (3, 5), each of the two support walls (3, 5) being opposite one another and essentially vertical, the two support walls forming an intermediate space (7) for holding and transporting the article (9).

3. The device as claimed in claim 2, wherein a distance between the two support plates (3, 5) is variable.

4. The device as claimed in claim 3, wherein at least one of the two support plates is adjustable transversely to a superficial extension of the at least one of the two support plates in order to vary the distance between the two support plates.

5. The device as claimed in claim 1, wherein the drain openings (23) are each arranged around the feed openings (21).

6. The device as claimed in claim 1, wherein each feed opening (21) in combination with several drain openings (23) forms a group (25), and all the groups are uniformly distributed over an entire surface of said support wall.

7. The device as claimed in claim 6, wherein the groups of feed openings (21) and drain openings (23) are uniformly distributed over the entire surface of said support wall.

8. The device as claimed in claim 1, wherein the support fluid is supplied directly via the feed opening (21) to a space on the first side of said support wall by a supply line (31).

9. The device as claimed in claim 8, wherein one supply line (31) is assigned to each feed opening (21) for supply of support fluid.

10. The device as claimed in claim 1, wherein the pressure increasing device (37) is a pump.

11. The device as claimed in claim 1, wherein the support fluid has a constant pressure over the entire surface of the article (9).

12. The device as claimed in claim 1, wherein the pressure of the support fluid can be variably set.

13. The device as claimed in claim 1, wherein the support fluid is a gas.

14. The device as claimed in claim 1, wherein the support fluid is a liquid.

15. The device as claimed in claim 1, wherein the support wall (3) is aligned horizontally and wherein the article (9) is located above the support wall (3).

16. The device as claimed in claim 1, wherein the supply chamber (39) extends over the entire surface of the second side of the support wall (3).

17. The device as claimed in claim 1, wherein a plurality of supply lines (31) connect to the feed openings (21) in the support wall (3) and penetrate the draining chamber (33).

18. The device as claimed in claim 17, wherein the plurality of supply lines (31) each have a first end tightly connected to the support wall (3) and a second end tightly connected to an intermediate wall (41) between the draining and the supply chambers (33, 39).

19. The device as claimed in claim 1, further comprising:
a pressure sensor (45) in a space (8) between the article (9) and the support wall (3).

20. The device as claimed in claim 19, wherein the pressure sensor (45) is dynamically connected to the pressure increasing device (37) by way of a control (47).

* * * * *